(12) United States Patent
Kurumaddali et al.

(10) Patent No.: US 12,462,109 B2
(45) Date of Patent: Nov. 4, 2025

(54) CONTEXTUAL SEARCH IN COLLABORATIVE COMMUNICATIONS APPLICATIONS

(71) Applicant: Microsoft Technology Licensing, LLC, Redmond, WA (US)

(72) Inventors: Venkata Madhu Sravanth Kurumaddali, Redmond, WA (US); Rashi Anand, Hyderabad (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 257 days.

(21) Appl. No.: 17/759,169

(22) PCT Filed: Dec. 8, 2020

(86) PCT No.: PCT/US2020/063721
§ 371 (c)(1),
(2) Date: Jul. 20, 2022

(87) PCT Pub. No.: WO2021/154395
PCT Pub. Date: Aug. 5, 2021

(65) Prior Publication Data
US 2022/0414129 A1    Dec. 29, 2022

(30) Foreign Application Priority Data
Jan. 30, 2020   (NL) ..................... 2024793

(51) Int. Cl.
*G06F 40/40*    (2020.01)
*G06F 40/205*    (2020.01)

(52) U.S. Cl.
CPC ............ *G06F 40/40* (2020.01); *G06F 40/205* (2020.01)

(58) Field of Classification Search
CPC .............................. G06F 40/40; G06F 40/205
See application file for complete search history.

(56) References Cited

U.S. PATENT DOCUMENTS 7,577,718 B2   8/2009   Slawson et al.
7,853,574 B2   12/2010   Kraenzel et al.
(Continued)

FOREIGN PATENT DOCUMENTS

CN        106415535 A       2/2017

OTHER PUBLICATIONS

"E-mail Search", Retrieved from: https://developer.searchblox.com/docs/email-search-plugin, Sep. 17, 2019, 5 Pages.
(Continued)

*Primary Examiner* — Fariba Sirjani
(74) *Attorney, Agent, or Firm* — Alleman Hall & Tuttle LLP

(57) ABSTRACT

One example provides, on a computing device, a method comprising iteratively receiving, from one or more collaborative communications applications, user data comprising communications of a user, analyzing the received user data to extract contextual information regarding the user, and sending the contextual information to a contextual information data store for the user. The method further comprises receiving a search query originating from within the collaborative communications application, parsing the search query to identify a referential search term, querying the contextual information data store for the user with the referential search term to identify previously stored contextual information regarding the user associated with the referential search term, and sending the previously stored contextual information identified to the collaborative communications application from which the search query was received.

17 Claims, 6 Drawing Sheets

(56) References Cited

U.S. PATENT DOCUMENTS

| | | | |
|---|---|---|---|
| 7,904,411 B2* | 3/2011 | Bechtel | G06F 16/36 |
| | | | 706/50 |
| 8,095,524 B2 | 1/2012 | Kandogan et al. | |
| 9,275,132 B2* | 3/2016 | Roberts | G06F 16/334 |
| 9,430,800 B2 | 8/2016 | Kristjansson | G06Q 40/04 |
| 9,501,530 B1* | 11/2016 | Jacobsson | G06F 16/27 |
| 9,710,539 B2 | 7/2017 | Dey et al. | |
| 9,710,555 B2* | 7/2017 | Smith | G06F 16/95 |
| 10,585,893 B2* | 3/2020 | Dantressangle | G06F 16/22 |
| 10,657,606 B2* | 5/2020 | Arvapally | G06Q 40/12 |
| 10,878,808 B1* | 12/2020 | Mathias | G10L 15/22 |
| 12,131,228 B2* | 10/2024 | Luz Xavier Da Costa | |
| | | | G06N 20/00 |
| 2002/0178161 A1 | 11/2002 | Brezin et al. | |
| 2009/0083251 A1* | 3/2009 | Sahasrabudhe | G06Q 40/06 |
| | | | 707/999.005 |
| 2012/0197732 A1* | 8/2012 | Shen | G06Q 30/02 |
| | | | 705/14.66 |
| 2013/0173604 A1* | 7/2013 | Li | G06F 16/9538 |
| | | | 707/723 |
| 2014/0114965 A1* | 4/2014 | Balduzzi | G06Q 50/10 |
| | | | 707/723 |
| 2016/0196336 A1* | 7/2016 | Allen | G06F 16/9535 |
| | | | 707/722 |
| 2016/0210363 A1 | 7/2016 | Rambhia et al. | |
| 2016/0299979 A1 | 10/2016 | Bawri et al. | |
| 2017/0286133 A1 | 10/2017 | Rambhia et al. | |
| 2018/0060326 A1 | 3/2018 | Kuo et al. | |
| 2018/0196812 A1* | 7/2018 | Gupta | G06F 40/284 |
| 2019/0155946 A1* | 5/2019 | Jaroch | G06Q 50/01 |
| 2020/0012738 A1* | 1/2020 | Tung | G06F 16/9024 |
| 2021/0142794 A1* | 5/2021 | Mathias | G10L 15/22 |
| 2022/0414129 A1* | 12/2022 | Kurumaddali | G06F 40/40 |

OTHER PUBLICATIONS

"Search Documents (Azure Search Service REST API)", Retrieved from: https://docs.microsoft.com/en-us/rest/api/searchservice/search-documents, Jul. 27, 2022, 18 Pages.

Lu, et al., "Information at your Fingertips: Contextual IR in Enterprise Email", In Proceedings of the 16th International Conference on Intelligent User Interfaces, Feb. 13, 2011, pp. 205-214.

"Search Report and Written Opinion issued in Netherlands Application No. N2024793", Mailed Date: Aug. 18, 2020, 3 Pages.

"International Search Report and Written Opinion Issued in PCT Application No. PCT/US2020/063721", Mailed Date: Mar. 12, 2021, 13 Pages.

Vegesna, Raju, "Introducing Zoho 'Actionable' Search", Retrieved from: https://www.zoho.com/blog/general/introducing-zoho-actionable-search.html#:~:text=As%20Zoho%20Search%20knows%20the,the%20Documents%20section%20as%20well, Jun. 1, 2010, 11 Pages.

First Office Action Received for Chinese Application No. 202080094951.3, mailed on Apr. 22, 2025, 20 pages. (English Translation Provided).

International Preliminary Report on Patentability Issued in PCT Application No. PCT/US2020/063721, Mailed Date: Aug. 11, 2022, 10 Pages.

* cited by examiner

CONTEXTUAL SEARCH IN COLLABORATIVE COMMUNICATIONS APPLICATIONS

CROSS REFERENCE TO RELATED APPLICATIONS

The present application is a U.S. National Phase of International Patent Application Serial No. PCT/US2020/063721 entitled "CONTEXTUAL SEARCH IN COLLABORATIVE COMMUNICATIONS APPLICATIONS", filed Dec. 8, 2020 which claims priority to Netherlands Patent Application Serial No. 2024793, filed Jan. 30, 2020, the entire contents of each of which are hereby incorporated by reference for all purposes.

BACKGROUND

Collaborative communications applications, such as email applications, may provide search capabilities to allow users to perform search queries to locate past communications of interest. Such search capabilities may be based on fuzzy keyword matching, string pattern based matching, or heuristic matching techniques.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

One example provides, on a computing device, a method comprising iteratively receiving, from one or more collaborative communications applications, user data comprising communications of a user, analyzing the received user data to extract contextual information regarding the user, and sending the contextual information to a contextual information data store for the user. The method further comprises receiving a search query originating from within collaborative communications application, parsing the search query to identify a referential search term, querying the contextual information data store for the user with the referential search term to identify previously stored contextual information regarding the user associated with the referential search term, and sending the previously stored contextual information identified to the collaborative communications application from which the search query was received.

Another example provides a computing device comprising a processor and a storage device comprising instructions executable by the processor to iteratively transmit user data to a contextual search service, from one or more collaborative communications applications executing on the computing device. The instructions are further executable to, separately, receive a user input of a search query in a collaborative communications application, the search query comprising a referential search term, send information on the search query to a contextual search service, the contextual search service comprising contextual information regarding the user, at least some of the contextual information regarding the user having been obtained from the user data provided by the one or more collaborative communications applications to the contextual search service, receive, from the contextual search service, previously stored contextual information regarding the user to augment the referential search term in the search query, and perform the search query with the previously stored contextual information regarding the user augmenting the referential search term.

DETAILED DESCRIPTION

Figure 1:
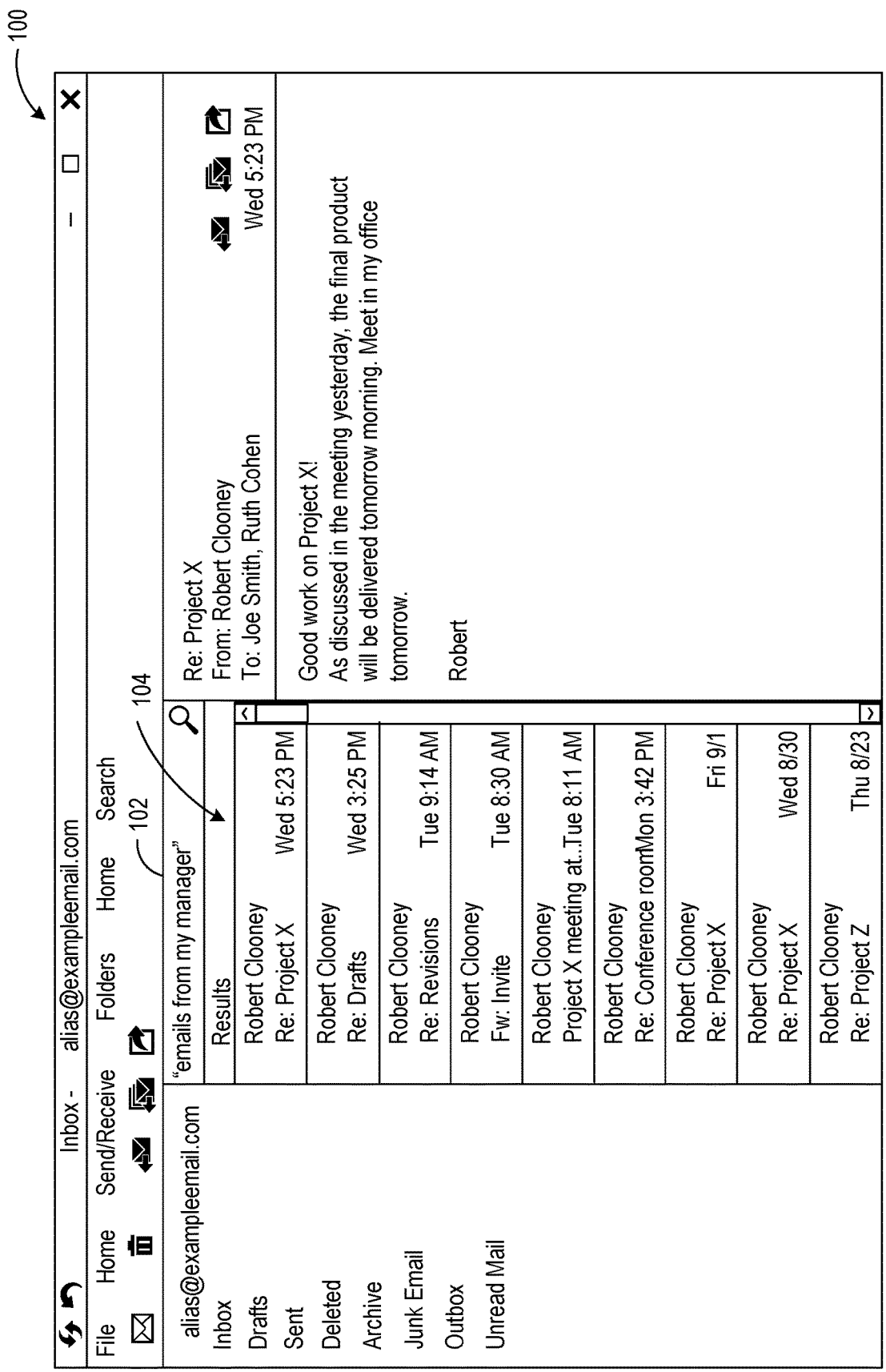
FIG. 1 shows a user interface 100 for an example collaborative communications application in the form of an email application.

As mentioned above, collaborative communications applications, such as email, chat and shared workspace applications, may provide search capabilities to allow a user to search for past communications of interest (e.g. emails in an inbox or other folder). However, the search modules of many existing collaborative communications applications may use techniques such as fuzzy keyword matching, string pattern matching, or heuristic-based methods to perform searches. Such techniques may not be able to accurately find relevant communications when referential search terms are entered by a user. The phrase "referential search term" and the like as used herein refer to search terms that refer to an object, a place, a time, or other definite term using contextually descriptive language, rather than by a definite identifier. For example, the search query "show emails from my last meeting" includes the referential term "from my last meeting," without including a specific time window for the meeting. As another example, the search query "show recent emails from my manager" includes the referential term "my manager," without a definite identification of the manager. As yet another example, the search query "show emails I have sent to Joe about my last project" include the referential search term "last project," and potentially the term "Joe", if the user communicates with more than one person named "Joe." All of these referential search terms have a specific contextual meaning with regard to the user, but refer to the meaning descriptively, as opposed to definitively. Such referential search terms, when used to perform a search using the techniques mentioned above, may not lead to accurate, or even relevant, search results. Further, applications that are configured to handle referential search terms in search queries may require a user to explicitly input personal information in a user profile to assist with such searches, and/or may be confined to a specific query command list.

Accordingly, examples are disclosed that relate to a contextual search service configured to automatically build a contextual information data store for the user, and use the contextual information data store to facilitate performing searches comprising referential search terms. The contextual information data store for a user is built by gathering user data from collaborative communications applications, and potentially from other applications (e.g. web searches from a web browser), during ordinary use of the applications by the user. The user data gathered is processed to extract contextual information regarding the user. The contextual information extracted is then stored in a secure store for the user for use in providing context for search queries entered by the user that have referential search terms. When a user performs, in a collaborative communication application, a search comprising a referential search term, the application can send information on the search query to the contextual search service to identify contextual information to augment the referential search term (e.g. by replacement of the referential search term or otherwise by inclusion in the search query) when executing the search query. As described in more detail below, the disclosed examples may provide near real-time updating of the stored contextual information of users and thereby assist users in performing searches based on the latest contextual information, without the users directly entering personal information. The search query inputs for which results are available are also not limited to a specific query command list. Instead, the disclosed examples may perform natural language processing on any search query and intelligently extract relevant information from the search query.

FIG. 1 shows an example user interface 100 in an example collaborative communications application, which takes the form of a client email application. The email application may be running on a device of a user, or at least partially as a network-based service (e.g. a "cloud" service in a network-accessible distributed computing environment) that is accessible by a browser or other application on a user's device. An example search query is shown at 102, requesting to search the user's email inbox for "emails from my manager." As mentioned above, existing search methods may not understand that "my manager" is a term referring to a specific individual, and may instead return search results identified based upon searching the literal words "my" and "manager," rather than based upon an actual identity of the user's manager. In contrast, according to the present disclosure, terms in the search query may be compared to the contextual information data store for the user to locate contextual information to augment any referential terms in the search query. In some examples, the search query entered by the user may be parsed using a natural language processing module to extract keywords from the search query and identify referential search terms. In the example of FIG. 1, the email client may send information on the search query (e.g. the search query in its entirety or a processed form of the search query, such as keywords extracted from the query) to the contextual search service, which identifies the entity Robert Clooney as the user's manager, based on previously extracted user information. Information regarding "Robert Clooney" is then used to augment the referential search term "my manager" to perform the search query, for example by replacing the term "my manager" in the query, thereby returning results that include emails that were sent from the user's manager, Robert Clooney, as shown at 104.

A search query also may include a referential temporal term. An example of a search query that includes temporal information is "emails from my last meeting." In this example, the contextual search service may be configured to identify when the user's last meeting occurred, and the search query may be augmented to search for emails sent and received during the identified time window. As another example, when a user enters the query "emails I sent about the last project," the contextual search service may be used to identify projects of the user, and the temporal language "most recent" can be used to by the contextual search service to determine the project with which the user was most recently involved. The identity of the project determined to be most recent may then be used to augment the search query.

Figure 2:
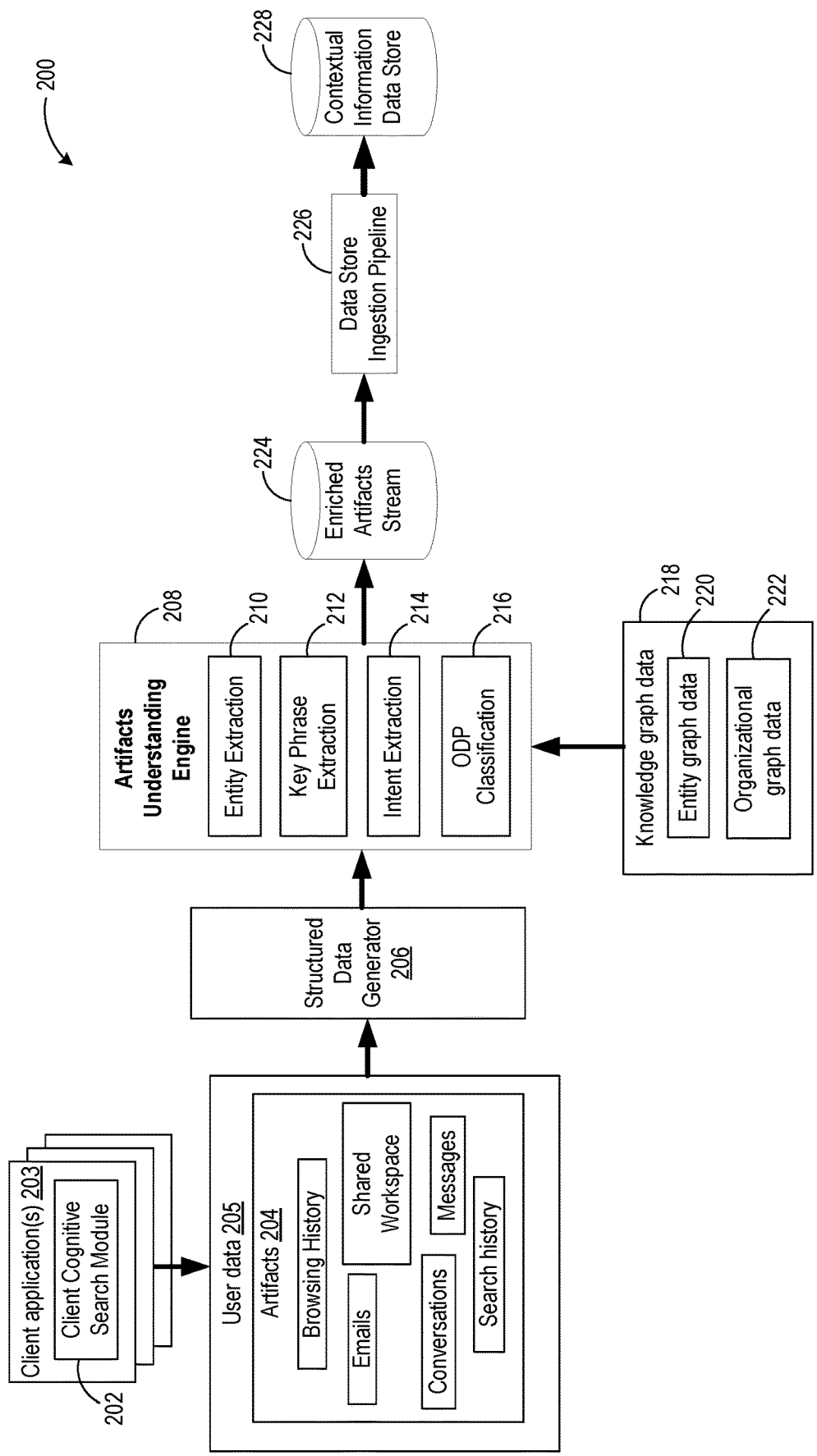
FIG. 2 shows an example architecture for a system for building a contextual information store for a user.

FIG. 2 shows an example architecture 200 for a system for building a contextual information store for a user. In this example, a client cognitive search module 202 may be provided for each of one or more client application(s) 203, which may be collaborative communications application(s). The client cognitive search module 202 provides cognitive contextual search capabilities to the client by querying the contextual search service with client search queries to provide enhanced search results to the user, and also helps to build and maintain a contextual information data store for the client, as described below. In some examples, the client cognitive search module 202 may take the form of a plugin installed on an email client or other communications client. In other examples, the search capabilities may be enacted via a digital assistant, or in any other suitable manner.

The client cognitive search module 202 provides an output of user data 205 comprising artifacts 204, which are items of contextual information contained within communications of a user made via the collaborative communications application(s). The user data 205 containing the artifacts 204 may comprise a user's browsing history, emails from an email client or online email service, shared files (e.g. documents, presentations, images, notes) from a shared workspace client application or web-based platform, chats in chat applications (including chat functionalities in other programs, such as video conferencing programs), meeting recordings from conferencing applications, and/or organizational search history, as examples.

The user data 205 comprising the artifacts 204 are sent to a structured data generator 206, which converts the user data 205 into a common structured format. The use of the common structured format may allow the AUE to analyze the data without having to understand formats of the data from different data sources. The structured data is provided to an artifacts understanding engine (AUE) 208. In other examples, user data may be provided to the AUE 208 without converting into a common structure. In some examples, the data may be converted to the structured format at the client application, whereas in other examples the data may be converted at the contextual search service.

The AUE 208 is configured to extract contextual information (e.g. the artifacts 204) from the user data 205, and store the contextual information in a data store for the user. The AUE 208 includes various modules configured to extract different types of artifacts from the user data for storage as contextual information. For example, the AUE 208 comprises an entity extraction module 210, wherein the term "entity" signifies real-world objects, people, places, organizations, concepts, numerical expressions (e.g. dates, times, currency amounts, phone numbers), as well as temporal expressions (e.g. dates, time, duration, frequency). As illustrative examples, entities may include a user's organization, team, manager, current projects, past projects, project timelines, mentor/mentee, meetings, areas of expertise, peers, live sites, preferred languages, location, interests, and language of communication.

The AUE 208 also includes a key phrase extraction module 212. Key phrase extraction may involve tagging text from the user data as parts of speech (e.g. nouns, pronouns, verbs, adjectives, adverbs, conjunctions, prepositions), and identifying key phrases based upon a relevance and/or frequency of use.

The AUE 208 additionally includes an intent extraction module 214. Intents represent high-level topics of interest as identified from the user data 205, such as technology, autos, travel, finance, programming languages, etc. The AUE 208 may use machine learning based models (e.g. classifiers implemented as neural networks, decision trees, etc.) built using trained data from a search engine, for example. The models may be trained using whitelisted queries and corresponding category labels generated by manual labeling. To perform intent extraction, text from user data is parsed and input into the trained machine learning based model to classify the text into one of the labeled categories, thereby providing a prediction of what the intent of the text may be.

The depicted AUE 208 further includes an open directory project (ODP) classification module 216. ODP defines an ontology of various categories for real-world entities. For example, in the context of a web-based search engine, web pages may be tagged with an ODP category that denotes the categories the web page belongs to, such as "Computers/Internet," "Autos/Service," "Sports/Football," etc. The AUE 208 may utilize the ODP category associated with the user's browsed web pages to identify the category associated with the user's content. ODP classification may give additional confidence for labeling user data, and is used as a further categorization step in addition to intent extraction. In other examples, an AUE may include a subset of the depicted modules, and/or any other desired contextual information extraction modules. Relationships between key phrases and identified entities may be mapped using the intents from the intent extraction module 214 and categories from the ODP classification module 216.

In addition to the user data 205, the AUE 208 may further receive knowledge graph data 218. A knowledge graph comprises an organization of data that represents entities and relationships between entities in graph format. Knowledge graph data 218 may include entity graph data 220 (e.g. search engine graph data) and organizational graph data 222 (e.g. company organizational graph data). The entity graph data 220 may come from an open-source knowledge base, a proprietary graph-based repository, and/or any other suitable entity database. Knowledge graph data may provide high confidence identifications of entities associated with a user, such as workplace relationships.

The organizational graph data 222 may include graph data regarding an organization's internal hierarchy/organizational structure. The organizational graph data 222 may also include graph data as received from a social networking service (e.g. LinkedIn, provided by Microsoft Corporation of Redmond, WA), which may include information regarding a user's professional connections, experiences, languages used by the user (including computer programming languages), companies with which the user has worked, etc. The AUE 208 may use the organizational graph data 216 to extract work entities for a user, for example.

Each module in the AUE 208 processes the received user data 205 comprising the artifacts 204, and performs the corresponding extractions and/or classifications. For each identified entity type/entity name pair (which may be expressed as a key-value pair), the AUE may output a confidence score regarding a confidence in the correctness of the relationship between the identified type and entity. In some examples, the confidence scores for each entity type/entity name pair identified from user data over time may be accumulated (e.g. by averaging, weighted averaging, or other suitable technique). The resulting cumulative confidence score may then be used as a thresholding metric to trigger the storage of the key-value pair in the contextual information data store, such that the key-value pair is stored in the contextual information data store for the user upon meeting a threshold cumulative confidence. Identified entities are output into an enriched artifacts stream 224 for storage in the contextual information data store 228 for the user if the confidence score for the extracted contextual information meets the threshold. Storing contextual information based upon meeting a threshold confidence may help to increase the likelihood that information used to augment search queries is correct, and thereby help to provide more accurate search results.

In the depicted example, the created enriched artifacts stream 224 is ingested using a data store ingestion pipeline 226. The depicted ingestion pipeline 226 represents a real-time data ingestion system for a cloud-based distributed data storage service. In other examples, any other mechanism may be used to write the enriched artifacts stream 224 to secure storage. The ingested data is stored in the secure contextual information data store 228 for the user. In some examples, the contextual information data store 228 may be located on premises for an entity, rather than in a cloud-based network-accessible distributed storage system.

The AUE 208 may execute the flow of FIG. 2 whenever updated user data 205 comprising artifacts 204 is received, thereby updating the contextual information data store 228 iteratively and automatically, and thus provides for the building and continual updating of the contextual information data store for the user in near-real time, without any user input to explicitly add contextual information.

Figure 3:
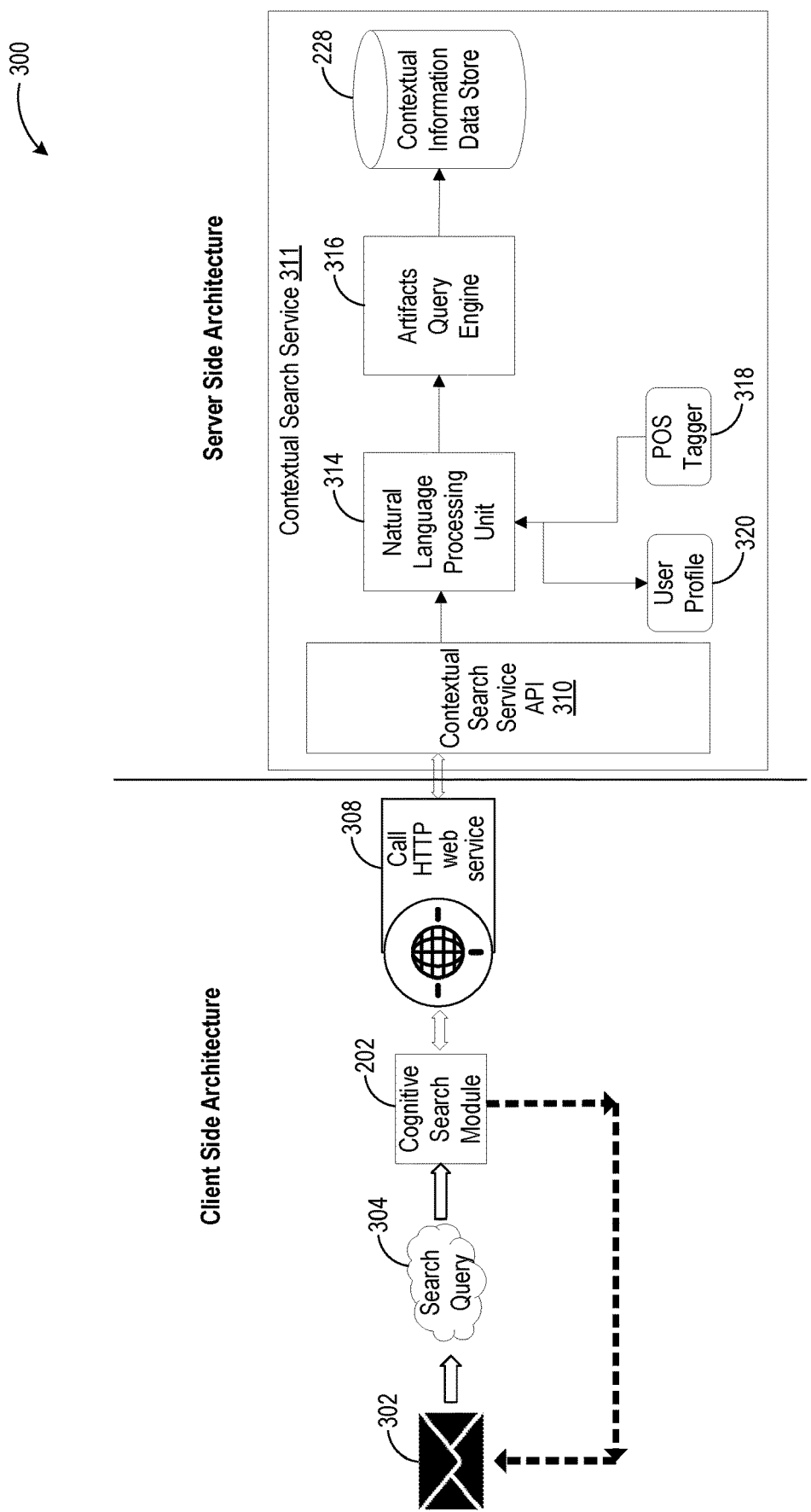
FIG. 3 shows an example architecture for a system for identifying contextual information in a contextual information store to augment a referential term in a contextual search query.

FIG. 3 shows an example system architecture 300 for performing a contextual search query, illustrating flow from client side to server side. In the depicted example, on the client side, a collaborative communications application 302 receives an input of a search query 304, and provides the search query to the client cognitive search module 202 (e.g. an application plugin or personal assistant), which calls 308 an application programming interface (API) 310 of the contextual search service 311 with the query. The contextual search service 311 may comprise a backend representational state transfer (REST) service that allows clients to query the contextual information data store 228 for stored contextual data.

The depicted contextual search service 310 comprises a natural language processing unit 314 and an artifacts query engine 316. The natural language processing unit 314 extracts keywords from the search query 304, for example, by running input strings into a parts of speech (POS) tagger 318. The POS tagger 218 may be a trained classifier. As an example of natural language processing, given an example search query "show my emails sent to my manager from my last meeting," the POS tagger may identify parts of speech in the query, and the natural language processing unit 314 may extract "emails" as an object, "manager" as a referential search term, and "last meeting" as another referential search term based at least in part upon tags applied to these parts of the query by the POS tagger. A user profile 320 may be used to identify any context related to the search query 304, e.g. based on information explicitly provided by the user.

The keywords and referential search terms from the natural language processing unit 314 are sent to the artifacts query engine 316, e.g. as a set of tokens in some examples. Further, as mentioned above, the natural language processing unit 314 may also add temporal information, which may help to sort the search results by time. It will be understood that although shown here as being on the server side, the natural language processing unit 314 may, in other examples, reside on the client side.

Next, the artifacts query engine 316 queries the contextual information data store 228 for previously stored entity information. For example, the artifacts query engine 316 may pass the input tokens, including the tokens from natural language processing as well as the current user as a token, to the contextual information data store 228, which returns entities that match the tokens. As a more specific example, the contextual information data store 228 may store "Robert Clooney" as "manager," and "Logging Review" as the "meeting" with the most recent time stamp for the current user. The entity information retrieved from storage is then sent to the collaborative communications application, and the search query 304 is performed with the entity information augmenting the referential search terms.

It will be understood that the flows described in FIG. 2 and FIG. 3 may run separately but contemporaneously, such that the contextual information store building/updating process may be performed in the background as a user uses the contextual search process of the application and other ordinary functionalities of the application.

Figure 4:
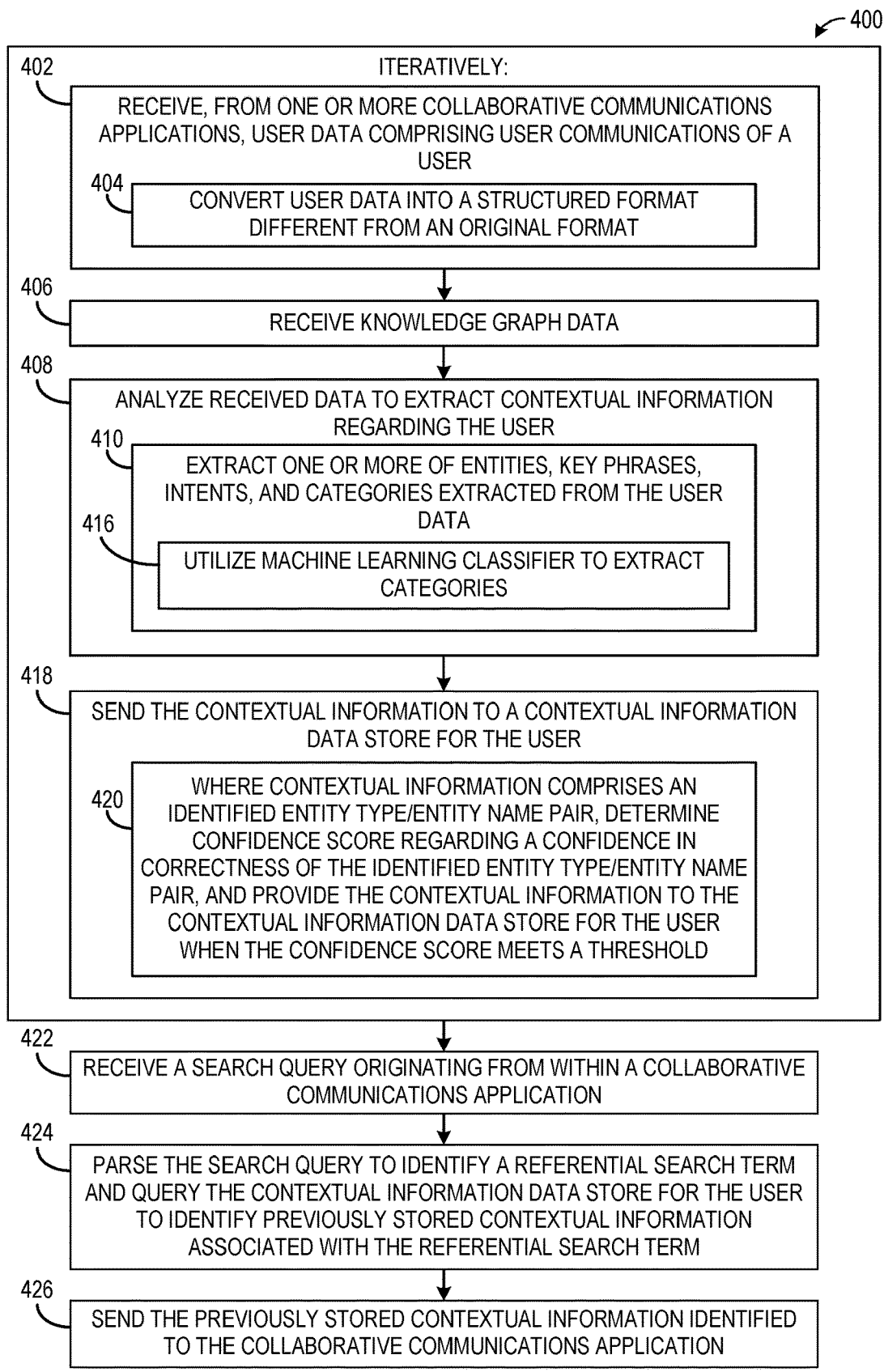
FIG. 4 shows an example method for building a contextual information store for a user.

FIG. 4 shows an example method 400 of building a contextual information store for a user. Method 400 is performed by a computing system comprising one or more computing devices. Method 400 includes, at 402, iteratively receiving, from one or more collaborative communications applications, user data comprising user communications of a user. In some examples, the user data may be converted into a structured format that is different from an original format of the user data, at 404. Method 400 further includes, at 406, receiving knowledge graph data regarding relationships within an organization comprising the user. As mentioned above, knowledge graph data may include entity graph data, as obtained from open source databases or proprietary databases, organizational graph data regarding an organization's internal hierarchy/organizational structure, and/or any other suitable information.

Method 400 further includes, at 408, analyzing received data, including the user data and knowledge graph data, to extract contextual information regarding the user. Extracting contextual information may include extracting entities key phrases, intents, and categories, at 410. Categories may include intents, e.g. high-level topics of interest, or categories as identified using open directory project (ODP) classification, as examples. In some examples, the categories may be extracted via a machine learning classifier, at 416.

Method 400 further includes, at 418, sending the contextual information extracted to a contextual information data store for the user. The contextual information data store may be any suitably secure data store, and may be located in a cloud-based distributed storage system, in a local server (e.g. on-premises), or at any other suitable network location. In some examples, where the contextual information includes an identified entity type/entity name pair, a confidence score may be determined regarding a confidence in a correctness of the identified entity type/entity name pair, and the contextual information may be provided to the contextual information data store for the user when the confidence score meets a threshold, at 420. Such a confidence score may be cumulative for the contextual information, such that the contextual information is provided to the contextual data store when the cumulative confidence score meets a threshold score.

Method 400 further includes, at 422, receiving a search query originating from within a collaborative communications application. The collaborative communications application from which the search query was received may be a different application than the one or more collaborative communications applications from which user data was received at 402, or may be within the one or more collaborative communications applications from which user data was received. Method 400 further includes, at 424, parsing the search query to identify a referential search term and querying the contextual information data store for the user to identify previously stored contextual information associated with the referential search term. The previously stored contextual information that is identified is then sent to the collaborative communications application from which the search query was received, at 426, for augmenting the referential search term.

Figure 5:
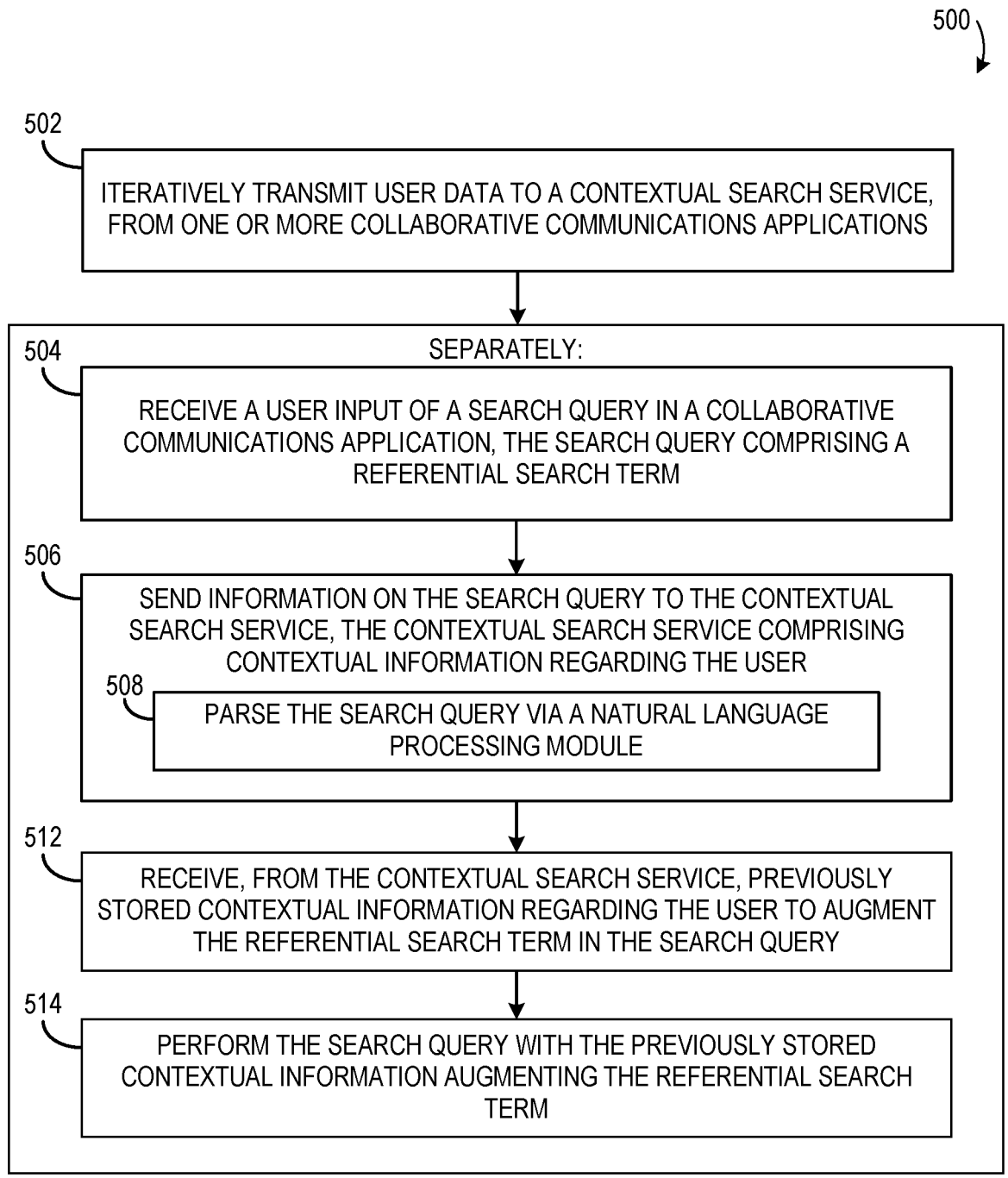
FIG. 5 shows an example method for performing a contextual search query in a collaborative communications application using a contextual information store.

FIG. 5 shows an example method 500 of performing a contextual search query. Method 500 is performed by a computing system comprising one or more computing devices. Method 500 includes, at 502, iteratively transmitting to a contextual search service, from one or more collaborative communications application. Method 500 further includes, separately, at 504, receiving a user input of a search query in a collaborative communications application. The collaborative communications application may be a different application than the one or more collaborative communications applications from which user data is transmitted, or may be within the one or more collaborative communications applications from which user data is transmitted. The search query may comprise a referential search term, as defined above. The referential search term may comprise a descriptive reference to a person, a place, an object, a time, and/or any other suitable corresponding definitive term. Method 500 includes, at 506, sending information on the search query to the contextual search service, the contextual search service comprising contextual information associated with the user obtained from the user data provided by the one or more collaborative communications application. In some examples, the search query is sent in full to the contextual search service. In other examples, the information sent to the contextual search service may include information obtained from parsing the search query via a natural language processing module, at 508.

Method 500 further includes, at 512, receiving, from the contextual search service, entity information to augment the referential search term, for example by replacing the referential search term or otherwise by being included in the search query. Method 500 further includes, at 514, performing the search query with the entity information augmenting the referential search term.

In some embodiments, the methods and processes described herein may be tied to a computing system of one or more computing devices. In particular, such methods and processes may be implemented as a computer-application program or service, an application-programming interface (API), a library, and/or other computer-program product.

Figure 6:
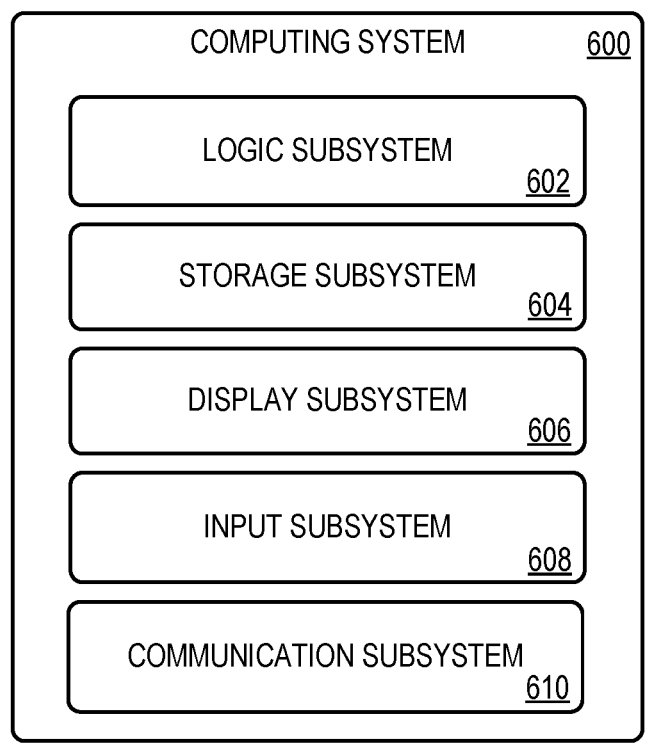
FIG. 6 shows a block diagram of an example computing system.

FIG. 6 schematically shows a non-limiting embodiment of a computing system 600 that can enact one or more of the methods and processes described above. Computing system 600 is shown in simplified form. Computing system 600 may take the form of one or more personal computers, server computers, tablet computers, home-entertainment computers, network computing devices, gaming devices, mobile computing devices, mobile communication devices (e.g., smart phone), and/or other computing devices.

Computing system 600 includes a logic subsystem 602 and a storage subsystem 604. Computing system 600 may optionally include a display subsystem 606, input subsystem 608, communication subsystem 610, and/or other components not shown in FIG. 6.

Logic subsystem 602 includes one or more physical devices configured to execute instructions. For example, logic subsystem 602 may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

Logic subsystem 602 may include one or more processors configured to execute software instructions. Additionally or alternatively, the logic subsystem 602 may include one or more hardware or firmware logic machines configured to execute hardware or firmware instructions. Processors of logic subsystem 602 may be single-core or multi-core, and the instructions executed thereon may be configured for sequential, parallel, and/or distributed processing. Individual components of the logic subsystem 602 optionally may be distributed among two or more separate devices, which may be remotely located and/or configured for coordinated processing. Aspects of the logic subsystem 602 may be virtualized and executed by remotely accessible, networked computing devices configured in a cloud-computing configuration.

Storage subsystem 604 includes one or more physical devices configured to hold instructions executable by logic subsystem 602 to implement the methods and processes described herein. When such methods and processes are implemented, the state of storage subsystem 604 may be transformed—e.g., to hold different data.

Storage subsystem 604 may include removable and/or built-in devices. Storage subsystem 604 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage subsystem 604 may include volatile, nonvolatile, dynamic, static, read/write, read-only, random-access, sequential-access, location-addressable, file-addressable, and/or content-addressable devices.

It will be appreciated that storage subsystem 604 includes one or more physical devices. However, aspects of the instructions described herein alternatively may be propagated by a communication medium (e.g., an electromagnetic signal, an optical signal, etc.) that is not held by a physical device for a finite duration.

Aspects of logic subsystem 602 and storage subsystem 604 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 600 implemented to perform a particular function. In some cases, a module, program, or engine may be instantiated via logic subsystem 602 executing instructions held by storage subsystem 604. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 606 may be used to present a visual representation of data held by storage subsystem 604. This visual representation may take the form of a graphical user interface (GUI). As the herein described methods and processes change the data held by the storage machine, and thus transform the state of the storage machine, the state of display subsystem 606 may likewise be transformed to visually represent changes in the underlying data. Display subsystem 606 may include one or more display devices utilizing virtually any type of technology. Such display devices may be combined with logic subsystem 602 and/or storage subsystem 604 in a shared enclosure, or such display devices may be peripheral display devices.

When included, input subsystem 608 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 610 may be configured to communicatively couple computing system 600 with one or more other computing devices. Communication subsystem 610 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 600 to send and/or receive messages to and/or from other devices via a network such as the Internet.

Another example provides, on a computing device, a method comprising, iteratively: receiving, from one or more collaborative communications applications, user data comprising communications of a user, analyzing the received user data to extract contextual information regarding the user, and sending the contextual information to a contextual information data store for the user. In this example, the method further comprises receiving a search query originating from within a collaborative communications application, parsing the search query to identify a referential search term, querying the contextual information data store for the user with the referential search term to identify previously stored contextual information regarding the user associated with the referential search term, and sending the previously stored contextual information identified to the collaborative communications application from which the search query was received. The user data from the one or more collaborative communications applications may additionally or alternatively include one or more of email data, messaging data, shared workspace data, file interaction data, and organizational search history data. The method may additionally or alternatively include receiving knowledge graph data regarding relationships within an organization comprising the user, analyzing the knowledge graph data to extract contextual information from the knowledge graph, and sending the contextual information from the knowledge graph to the contextual information data store. The method may additionally or alternatively include converting the user data into a structured format different from an original format of the user data. The contextual information may additionally or alternatively include one or more of entities, key phrases, categories, and intents extracted from the user data. The method may additionally or alternatively include utilizing a machine learning classifier to analyze the user data to extract the categories. The collaborative communications application from which the search query was received may additionally or alternatively be different than the one or more collaborative communications applications from which the user data comprising the communications of the user is received. The contextual information may additionally or alternatively include an identified entity type/entity name pair, and extracting the contextual information may additionally or alternatively include determining a confidence score regarding a confidence in the correctness of the identified entity type/entity name pair, and providing the contextual information to the contextual information data store for storage when the confidence store for the contextual information meets a threshold. The confidence score may additionally or alternatively be a cumulative confidence score based upon a plurality of identifications of the identified entity type/entity name pair A computer program which, when executed on a processor of a computing device, may additionally or alternatively be configured to carry out the method.

Another example provides a computing device, comprising a processor, and a storage device comprising instructions executable by the processor to: iteratively transmit user data to a contextual search service, from one or more collaborative communications applications executing on the computing device, separately, receive a user input of a search query in collaborative communications application, the search query comprising a referential search term, send information on the search query to the contextual search service, the contextual search service comprising contextual information regarding the user, at least some of the contextual information regarding the user having been obtained from the user data provided by the one or more collaborative communications applications to the contextual search service, receive, from the contextual search service, previously stored contextual information regarding the user to augment the referential search term in the search query, and perform the search query with the previously stored contextual information regarding the user augmenting the referential search term. The user data from the collaborative communications application may additionally or alternatively include one or more of email data, messaging data, file interaction data, and organizational search history data. The instructions may additionally or alternatively be executable to parse the search query through a natural language processing module. The contextual information may additionally or alternatively include one or more of entities, key phrases, intents, and categories extracted from the user data. The information on the search query sent to the contextual search service may additionally or alternatively include a temporally referential search term.

Another example provides a computing device, comprising a processor, and a storage device comprising instructions executable by the processor to, iteratively: receive, from one or more collaborative communications application, user data comprising communications of a user, analyze the received user data to extract contextual information regarding the user, and send the contextual information to a contextual information data store for the user. In this example, the instructions are further executable to receive a search query originating from within collaborative communications application, parse the search query to identify a referential search term, query the contextual information data store with the referential search term to identify previously stored contextual information regarding the user associated with the referential search term, and send the previously stored contextual information identified to the collaborative communications application from which the search query was received. The user data from the one or more collaborative communications applications may additionally or alternatively include one or more of email data, messaging data, shared workspace data, file interaction data, and organizational search history data. The instructions may additionally or alternatively be executable to receive knowledge graph data regarding relationships within an organization comprising the user, analyze the knowledge graph data to extract contextual information from the knowledge graph, and send the contextual information extracted from the knowledge graph to the contextual information store for the user. The contextual information may additionally or alternatively include an identified entity type/entity name pair, and the instructions may additionally or alternatively be executable to extract the contextual information by determining a confidence score regarding a confidence in a correctness of the identified entity type/entity name, and provide the contextual information to the contextual information data store for storage when the confidence store for the contextual information meets a threshold. The collaborative communications application from which the search query is received may additionally or alternatively be different than the one or more collaborative communications applications from which the user data is received.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. On a computing device, a method comprising:
   iteratively,
      receiving user data comprising communications of a user from one or more collaborative communications applications,
      analyzing the received user data to extract contextual information regarding the user, and
      providing the contextual information regarding the user to a contextual information data store for the user, wherein the contextual information regarding the user comprises an identified entity type/entity name pair, and wherein analyzing the received user data to extract the contextual information regarding the user further comprises determining a confidence score regarding a confidence in a correctness of a relationship between an identified entity type of the identified entity type/entity name pair and an identified entity name of the identified entity type/entity name pair, wherein the confidence score comprises a cumulative confidence score obtained from combining separate confidence scores associated with separate ones of a plurality of identifications of the identified entity type/entity name pair, and wherein the cumulative confidence score is compared to a threshold confidence score for providing the identified entity type/entity name pair to the contextual information data store, and wherein providing the contextual information regarding the user to the contextual information data store for the user comprises providing the contextual information regarding the user to the contextual information data store for the user for storage based at least upon the cumulative confidence score meeting the threshold confidence score; and, separately, receiving a user input of a search query originating from within an originating collaborative communications application, parsing the search query to identify a referential search term, performing the search query with the previously stored contextual information regarding the user augmenting the referential search term by querying the contextual information data store for the user with the referential search term to identify previously stored contextual information regarding the user associated with the referential search term; and sending the identified previously stored contextual information regarding the user to the originating collaborative communications application.

2. The method of claim 1, wherein the user data from the one or more collaborative communications applications comprises one or more of email data, messaging data, shared workspace data, file interaction data, or organizational search history data.

3. The method of claim 1, further comprising converting the user data into a structured format different from an original format of the user data.

4. The method of claim 1, wherein the contextual information regarding the user comprises one or more of entities, key phrases, categories, and intents extracted from the user data.

5. The method of claim 4, further comprising utilizing a machine learning classifier to analyze the user data to extract the one or more categories.

6. The method of claim 1, wherein the originating collaborative communications application is different than the one or more collaborative communications applications from which the user data is received.

7. The method of claim 1, further comprising parsing the search query through natural language processing.

8. A computing device, comprising:
a processor; and
a storage device comprising instructions executable by the processor to:
iteratively transmit user data to a contextual search service on a receiving computing device, from one or more collaborative communications applications executing on the computing device;

separately, receive a user input of a search query in a collaborative communications application, the search query comprising a referential search term, send information on the search query to the contextual search service, the contextual search service comprising contextual information regarding the user, at least some of the contextual information regarding the user having been obtained from the user data provided by the one or more collaborative communications applications to the contextual search service, receive, from the contextual search service, previously stored contextual information regarding the user to augment the referential search term in the search query, and perform the search query with the previously stored contextual information regarding the user augmenting the referential search term, wherein the previously stored contextual information regarding the user comprises a confidence score for the contextual information regarding the user that meets a threshold confidence score, the contextual information regarding the user comprising an identified entity type/entity name pair, and the confidence score regards a confidence in a correctness of a relationship between an identified entity type of the identified entity type/entity name pair and an identified entity name of the identified entity type/entity name pair, and comprises a cumulative confidence score obtained from combining separate confidence scores associated with separate ones of a plurality of identifications of the identified entity type/entity name pair, and wherein the cumulative confidence score is compared to the threshold confidence score for providing the identified entity type/ entity name pair to a contextual information data store.

9. The computing device of claim 8, wherein the user data from the one or more collaborative communications applications comprises one or more of email data, messaging data, file interaction data, or organizational search history data.

10. The computing device of claim 8, wherein the instructions are further executable to parse the search query through a natural language processing module.

11. The computing device of claim 8, wherein the contextual information regarding the user comprises one or more of entities, key phrases, intents, or categories extracted from the user data.

12. The computing device of claim 8, wherein the information on the search query sent to the contextual search service comprises a temporally referential search term.

13. A computing device, comprising:
a processor; and
a storage device comprising instructions executable by the processor to:
iteratively receive, from one or more collaborative communications applications, user data comprising communications of a user, and receive knowledge graph data regarding relationships within an organization comprising the user;

analyze the user data and the knowledge graph data to extract contextual information regarding the user, wherein the contextual information regarding the user comprises an identified entity type/entity name pair;

determine a confidence score regarding a confidence in a correctness of a relationship between an identified entity type of the identified entity type/entity name pair and an identified entity name of the identified entity type/entity name pair, wherein the confidence score comprises a cumulative confidence score obtained from combining separate confidence scores associated with separate ones of a plurality of identifications of the identified entity type/entity name pair, and wherein the cumulative confidence score is compared to a threshold confidence score for providing the identified entity type/entity name pair to a contextual information data store;

send the contextual information regarding the user to the contextual information data store for the user based at least upon the confidence score regarding the confidence in the correctness of the identified entity type/entity name pair for the contextual information regarding the user meeting the threshold confidence score;

receive a search query originating from within a collaborative communications application;

parse the search query to identify a referential search term;

perform the search query with the previously stored contextual information regarding the user augmenting the referential search term by querying the contextual information data store for the user with the referential search term to identify previously stored contextual information regarding the user associated with the referential search term; and send the previously stored contextual information regarding the user associated with the referential search term to the collaborative communications application, wherein the contextual information regarding the user comprises an identified entity type/entity name pair.

14. The computing device of claim 13, wherein the user data comprises one or more of email data, messaging data, shared workspace data, file interaction data, and organizational search history data.

15. The computing device of claim 13, wherein the collaborative communications application from which the search query is received is different than the one or more collaborative communications applications from which the user data is received.

16. The computing device of claim 13, wherein the instructions are further executable to convert the user data into a structured format different from an original format of the user data.

17. The computing device of claim 13, wherein the instructions are executable to extract one or more of entities, key phrases, intents, or categories extracted from the user data.

* * * * *